US011347456B2

(12) United States Patent
Natori

(10) Patent No.: US 11,347,456 B2
(45) Date of Patent: May 31, 2022

(54) APPARATUS FOR PROCESSING SETTING FOR PUNCHING ROWS OF HOLES IN SHEET, METHOD THEREFOR AND STORAGE MEDIUM

(71) Applicant: CANON KABUSHIKI KAISHA, Tokyo (JP)

(72) Inventor: Takuya Natori, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/095,582

(22) Filed: Nov. 11, 2020

(65) Prior Publication Data

US 2021/0157537 A1 May 27, 2021

(30) Foreign Application Priority Data

Nov. 25, 2019 (JP) .............................. JP2019-212296

(51) Int. Cl.
*G06F 3/12* (2006.01)
*B26D 5/00* (2006.01)

(52) U.S. Cl.
CPC ............. *G06F 3/1255* (2013.01); *B26D 5/00* (2013.01); *G06F 3/121* (2013.01); *G06F 3/125* (2013.01); *G06F 3/1257* (2013.01); *G06F 3/1201* (2013.01); *G06F 3/1204* (2013.01)

(58) Field of Classification Search
CPC ...... G06F 3/1255; G06F 3/125; G06F 3/1257; G06F 3/121; G06F 3/1285; G06F 3/1262; G06F 3/1205; G06F 3/1252; B26D 5/00
USPC ....................................................... 358/1.15
See application file for complete search history.

(56) References Cited

U.S. PATENT DOCUMENTS

| | | | |
|---|---|---|---|
| 2007/0168382 A1* | 7/2007 | Tillberg ............. | G06K 9/00449 |
| 2012/0092713 A1* | 4/2012 | Hagiwara ............. | G06F 3/1238 |
| | | | 358/1.15 |
| 2018/0162674 A1* | 6/2018 | Nakano .................. | B65H 5/062 |

FOREIGN PATENT DOCUMENTS

JP          2003233475 A      8/2003

* cited by examiner

*Primary Examiner* — Darryl V Dottin
(74) *Attorney, Agent, or Firm* — Canon U.S.A., Inc. I.P. Division

(57) ABSTRACT

An apparatus includes a storage unit and a control unit. The storage unit stores conflict information indicating that a setting for printing a predetermined number of pages on one surface of one sheet conflicts with a setting for punching a plurality of rows of holes in the one sheet. The control unit performs control to prohibit generation of a print command including the printing and punching settings based on the conflict information stored in the storage unit.

30 Claims, 18 Drawing Sheets

| 1 | 2 |
|---|---|
| 3 | 4 |
| 5 | 6 |

FIRST SHEET

| 7 | 8 |
|---|---|
| 9 | 10 |
| 11 | 12 |

SECOND SHEET

...

| $6(k-1)+1$ | $6(k-1)+2$ |
|---|---|
| $6(k-1)+3$ | $6(k-1)+4$ |
| $6(k-1)+5$ | $6k$ | k-TH SHEET

FIG.10B

| 1 | 2 | 3 |
|---|---|---|
| 4 | 5 | 6 |

FIRST SHEET

| 7 | 8 | 9 |
|---|---|---|
| 10 | 11 | 12 |

SECOND SHEET

...

| $6(k-1)+1$ | $6(k-1)+2$ | $6(k-1)+3$ |
|---|---|---|
| $6(k-1)+4$ | $6(k-1)+5$ | $6k$ | k-TH SHEET

FIG.15

| SHEET SIZE | 2-IN-1 PAGE PRINTING ORIENTATION |
|---|---|
| A4 | LONG-SIDE DIRECTION |
| B5 | LONG-SIDE DIRECTION |
| ... | ... |
| N3 ENVELOPE | LONG-SIDE DIRECTION |
| com10 | SHORT-SIDE DIRECTION |
| ... | ... |

APPARATUS FOR PROCESSING SETTING FOR PUNCHING ROWS OF HOLES IN SHEET, METHOD THEREFOR AND STORAGE MEDIUM

BACKGROUND

Field

The present disclosure relates to an apparatus for processing a setting for punching a plurality of rows of holes in a sheet, a method for the apparatus and a storage medium.

Description of the Related Art

Some settings for applications on an information processing apparatus that generates a print instruction for an image processing apparatus include an N-in-one printing function for aggregating data on a plurality of pages. In this regard, Japanese Patent Application Laid-Open No. 2003-233475 discusses a printing system capable of setting a page layout in which all pages are printed on a designated number of sheets, without the need for a user to be aware of calculations of, for example, the number of pages to be printed on one sheet in N-in-one printing.

SUMMARY

There is an option device for a printing device that corresponds to a punching function for punching holes in each output sheet, for example, to bind output sheets. There is another option device for a printing device that corresponds to a double punching function for punching two rows of holes, i.e., a row of holes at an end of an output sheet and a row of holes at the center of the output sheet. One merged document obtained by preliminarily performing a double punching process on a large sheet is cut at the center thereof, thereby obtaining two punched sheets from the one merged document.

In the case of performing the punching process as described above, when specific N-in-one printing is performed along with the punching process, an image may be printed on a cutting section when the merged document obtained after the punching process is cut.

According to an aspect of the present disclosure, an apparatus includes a storage unit configured to store conflict information indicating that a setting for printing a predetermined number of pages on one surface of one sheet conflicts with a setting for punching a plurality of rows of holes in the one sheet, and a control unit configured to perform control to prohibit generation of a print command including the printing and punching settings based on the conflict information stored in the storage unit.

Further features of the present disclosure will become apparent from the following description of exemplary embodiments with reference to the attached drawings.

BRIEF DESCRIPTION OF THE DRAWINGS

FIGS. 8A, 8B, and 8C are schematic diagrams each illustrating a normal output material when "9-in-1" is set.

FIGS. 10A and 10B are schematic diagrams each illustrating an output material based on a special page layout according to the second exemplary embodiment.

FIG. 15 is a correlation table illustrating a correlation between a sheet size and an N-in-one printing orientation according to the fourth exemplary embodiment.

DESCRIPTION OF THE EMBODIMENTS

The following exemplary embodiments are not intended to limit the present disclosure described in the claims, and not all combinations of features described in the exemplary embodiments are essential to the present disclosure.

Figure 1:
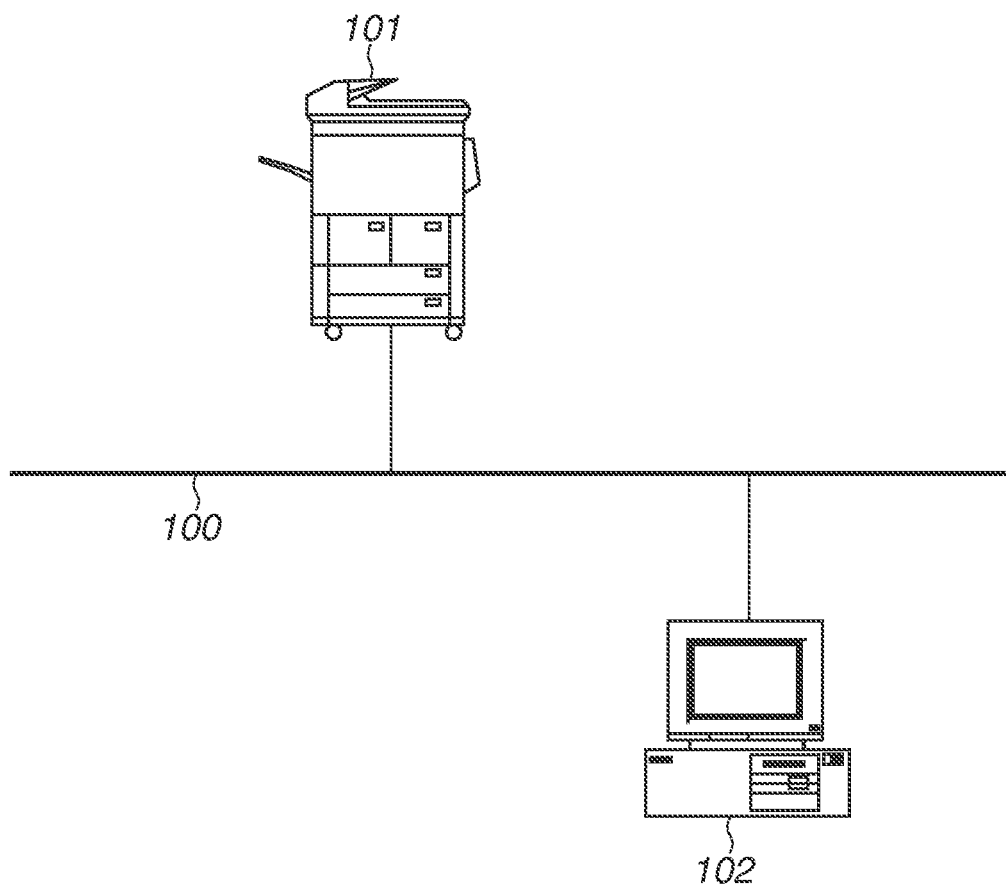
FIG. 1 illustrates a configuration of a printing system according to a first exemplary embodiment.

A configuration of a printing system according to a first exemplary embodiment will be described. FIG. 1 illustrates an example of the printing system according to the first exemplary embodiment. An image processing apparatus 101 and an information processing apparatus 102 are each connected to a network 100. An operating system (OS) and applications are installed in the information processing apparatus 102. In this system, a user uses an application from the information processing apparatus 102 to transmit a print job to the image processing apparatus 101. In a case where an information device as typified by a general personal computer (PC) is used as the information processing apparatus 102, an application for transmitting a print job to the target image processing apparatus 101 via a printer driver can be used.

Figure 2:
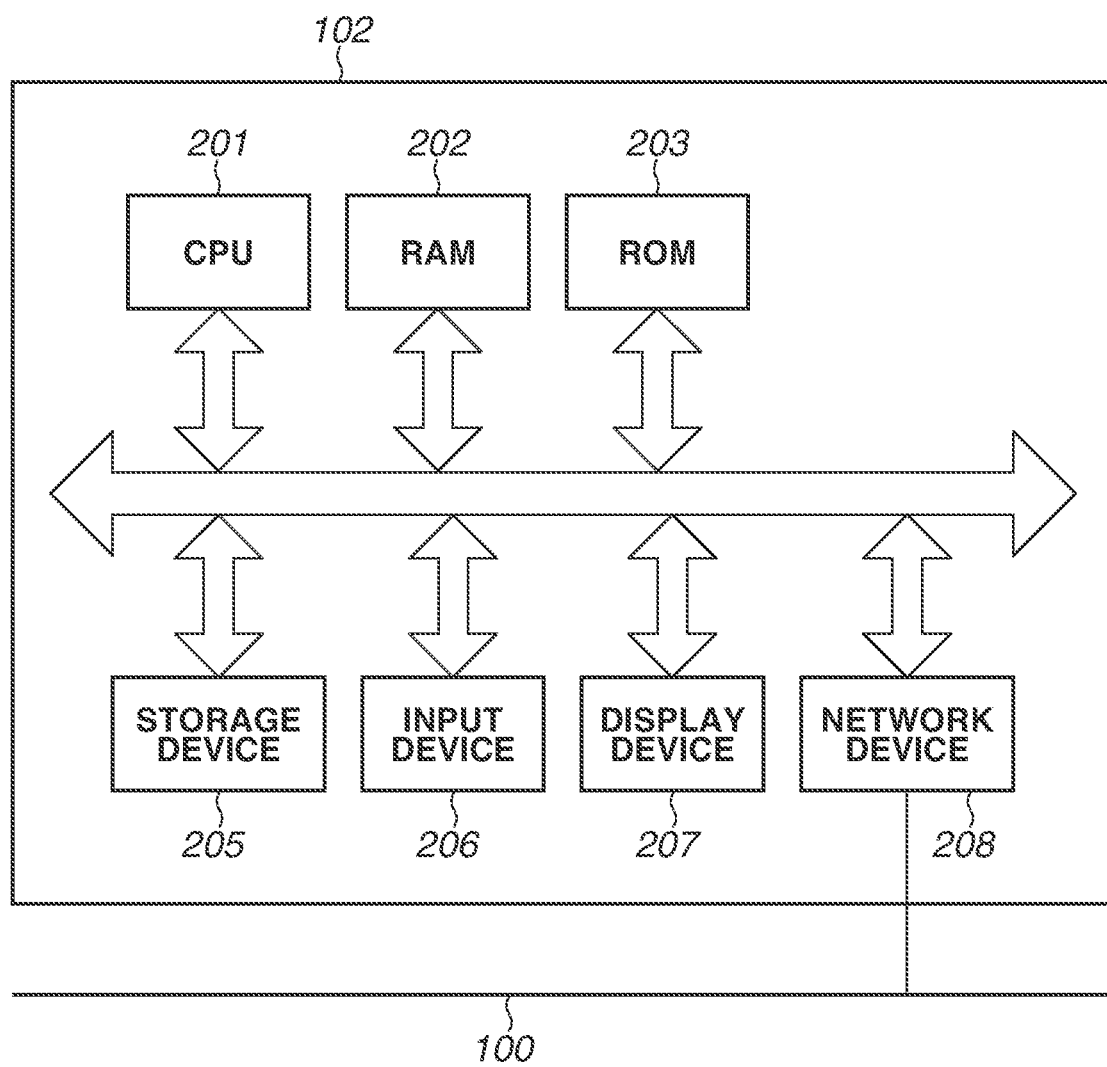
FIG. 2 is a block diagram illustrating an information processing apparatus.

A hardware configuration of each device that constitutes the printing system will be described. FIG. 2 is a block diagram illustrating the information processing apparatus 102. An input device 206 corresponds to a keyboard, a mouse, or a touch panel, which is used for the user to operate the information processing apparatus 102. A display device 207 corresponds to a display used for the user to operate the information processing apparatus 102. For example, like a touch panel, a part or the whole of the display device 207 can function as the input device 206. A storage device 205 corresponds to a storage medium as typified by a nonvolatile hard disk for storing a large capacity of data. Applications and data are read from or written into the storage device 205. A network device 208 is connected to the network 100, which is described above with reference to FIG. 1, and thus can communicate with other devices. A central processing unit (CPU) 201 controls the information processing apparatus 102.

In general, an initial program for starting up the information processing apparatus 102 and basic programs for controlling each module of the information processing apparatus 102 are stored in a read-only memory (ROM) 203. An OS and applications are stored in the storage device 205. When the information processing apparatus 102 is powered on, a program (boot loader) for starting up the computer, which is stored in the ROM 203, is executed. The program loads the OS stored in the storage device 205 into a random access memory (RAM) 202, and then transfers control to the OS. The OS further loads necessary modules and drivers into the RAM 202 from the storage device 205. Further, based on a user instruction, necessary applications are loaded into the RAM 202 from the storage device 205, and the loaded applications are executed.

Figure 3:
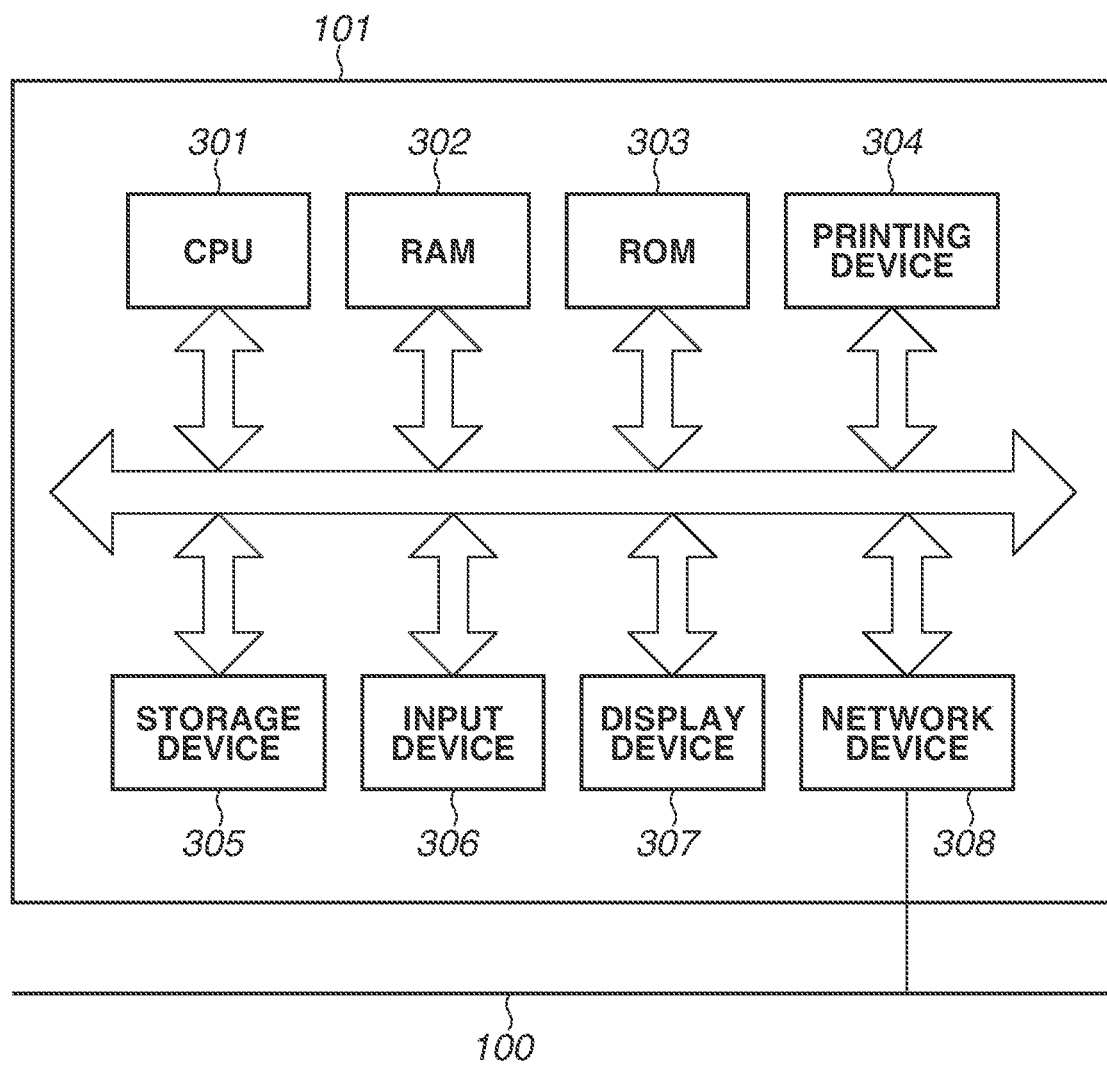
FIG. 3 is a block diagram illustrating an image processing apparatus.

FIG. 3 is a block diagram illustrating an image processing apparatus 101. Configurations of a CPU 301, a RAM 302, a ROM 303, a storage device 305, a display device 307, and a network device 308 are similar to those of the information processing apparatus 102, and thus the descriptions thereof are omitted. An input device 306 can be composed of a numeric keypad, various buttons, and the like. A printing device 304 loads print data included in a print job into the RAM 302, executes printing, and outputs a print product.

The first exemplary embodiment is implemented such that programs stored in the storage device 205 of the information processing apparatus 102 and the storage device 305 of the image processing apparatus 101 are loaded into the RAM 202 and the RAM 302, respectively, and then CPUs 201 and 301 execute the loaded programs.

Figure 4:
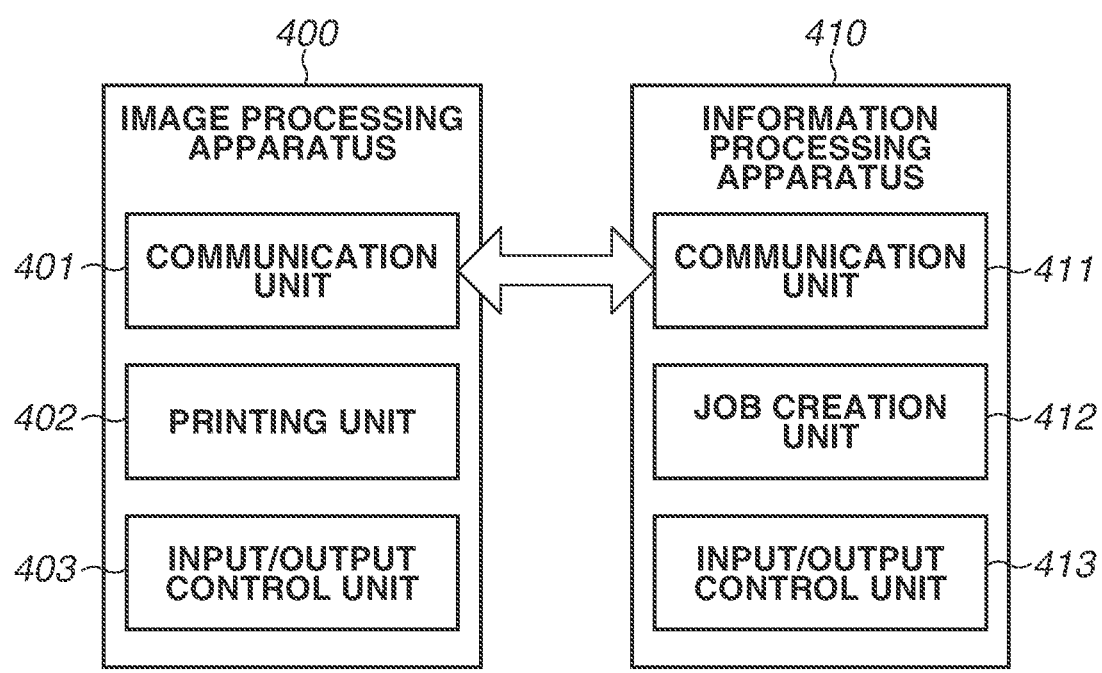
FIG. 4 is a block diagram illustrating a software configuration of the printing system according to the first exemplary embodiment.

Functions of each apparatus constituting the printing system according to the first exemplary embodiment will be described. FIG. 4 is a block diagram illustrating a software configuration of the printing system according to the first exemplary embodiment.

An image processing apparatus 400 includes a communication unit 401, a printing unit 402, and an input/output control unit 403. The communication unit 401 implements communication with other devices via the network 100. The printing unit 402 executes a print job in the image processing apparatus 101, and outputs a print product. The input/output control unit 403 controls information to be input from the input device 306 and information to be output to the display device 307.

An information processing apparatus 410 includes a communication unit 411, a job creation unit 412, and an input/output control unit 413. The communication unit 411 implements communication with other devices via the network 100. The job creation unit 412 creates, as a print job, print data that can be interpreted by the image processing apparatus 101. The input/output control unit 413 controls information input from the input device 206 and information to be output to the display device 207. These devices communicate with each other via the communication units 401 and 411, thereby forming the printing system.

Processing to be performed by the printing system according to the first exemplary embodiment will be described below.

Figure 5:
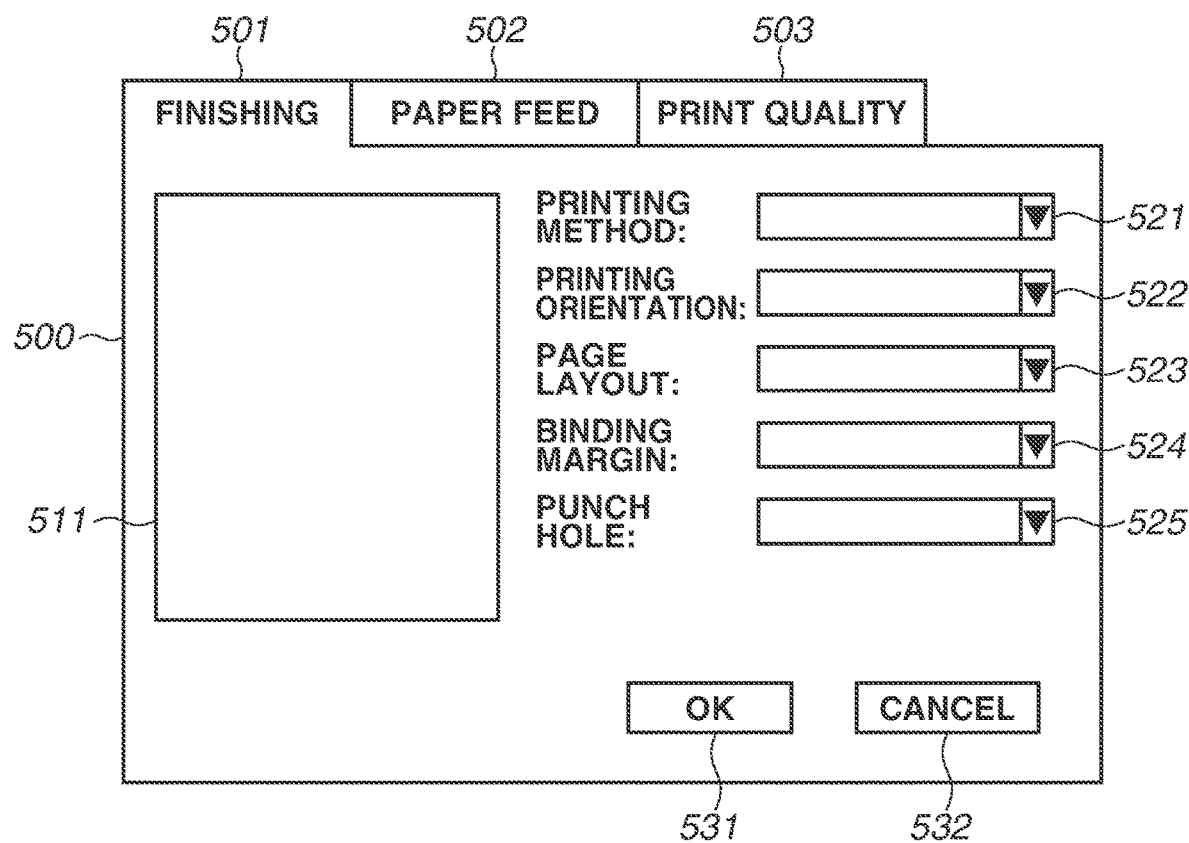
FIG. 5 illustrates a print setting user interface (UI) for a printer driver.

FIG. 5 illustrates a print setting user interface (UI) for a printer driver according to the first exemplary embodiment. A print setting UI 500 includes function selection tabs 501 to 503. Since there are a variety of printer driver functions, the print setting UI 500 has a mechanism in which print settings are implemented on different sheets depending on the type of the functions. In this case, "finishing" is selected as a function sheet and thus settings for an imposition process and finishing during printing can be made. A preview 511 illustrates an output result obtained based on the current print settings by displaying the output result schematically or with a reduced size. A printing method selection area 521 allows the user to select one of single-sided printing and double-sided printing. A printing orientation selection area 522 allows the user to select one of a vertical direction and a horizontal direction. A page layout selection area 523 allows the user to select the number of pages for N-in-one printing in the imposition process. Assume herein that any one of "1-in-1", "2-in-1", "4-in-1", "6-in-1", "8-in-1", "9-in-1", and "16-in-1" can be selected. "N-in-1" is a setting for arranging N pages on one surface (a front surface or a back surface) of one sheet. Specifically, a numeric value that precedes "in-1" indicates the number of pages to be arranged on one surface of one sheet. A binding location selection area 524 allows the user to select a location where a binding margin is provided. Assume herein that long-side binding and short-side binding can be selected. A punch hole selection area 525 allows the user to designate the number of holes to be punched for finishing. Assume herein that no holes, two holes, three holes, two holes (double), and three holes (double) can be selected. Also, assume that the punching process is performed based on a value selected in the binding location selection area 524. The term "double" used herein refers to two rows.

Figure 6A:
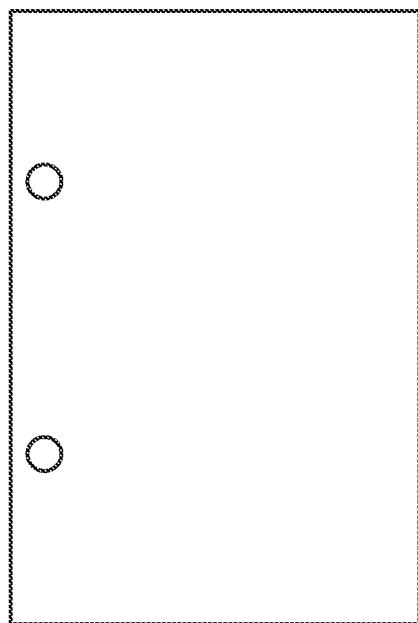
FIGS. 6A, 6B, 6C, and 6D are schematic diagrams each illustrating an output material obtained after a punching process.
Figure 6B:
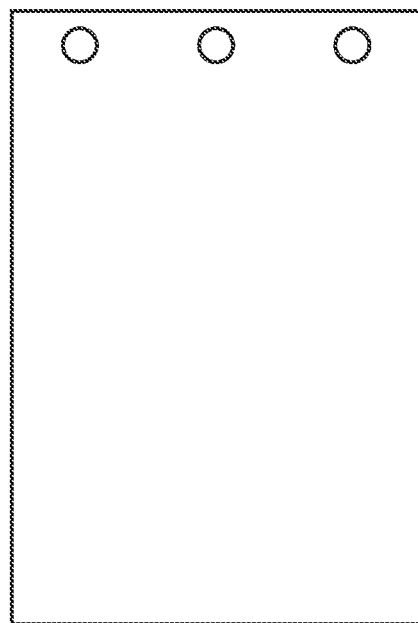
Figure 6C:
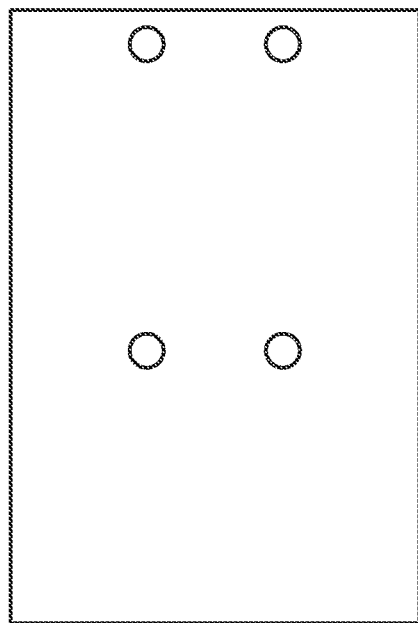
Figure 6D:
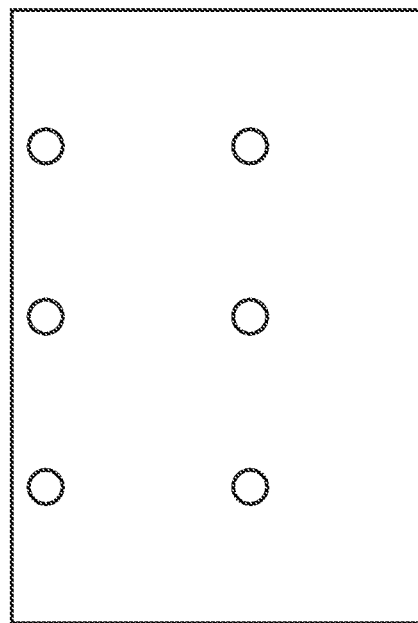

FIGS. 6A to 6D are schematic diagrams each illustrating an output material obtained after the punching process. Assume that, in each of FIGS. 6A to 6D, the vertical direction is selected in the printing orientation selection area 522. FIG. 6A illustrates a case where "long-side binding" is selected in the binding location selection area 524 and "two holes" is selected in the punch hole selection area 525. FIG. 6B illustrates a case where "short-side binding" is selected in the binding location selection area 524 and "three holes" is selected in the punch hole selection area 525. FIG. 6C illustrates a case where "short-side binding" is selected in the binding location selection area 524 and "two holes (double)" is selected in the punch hole selection area 525. FIG. 6D illustrates a case where "long-side binding" is selected in the binding location selection area 524 and "three holes (double)" is selected in the punch hole selection area 525. As illustrated in FIGS. 6C and 6D, in a case where "two holes (double)" and "three holes (double)" are selected in the punch hole selection area 525, a merged document formed by punching holes in parallel in the direction designated in the binding location selection area 524 can be obtained.

In a case where an OK button 531 illustrated in FIG. 5 is pressed, a process for generating a print job in which contents set on the print setting UI 500 are reflected starts. In a case where a cancel button 532 is pressed, the print setting ends.

Figure 7:
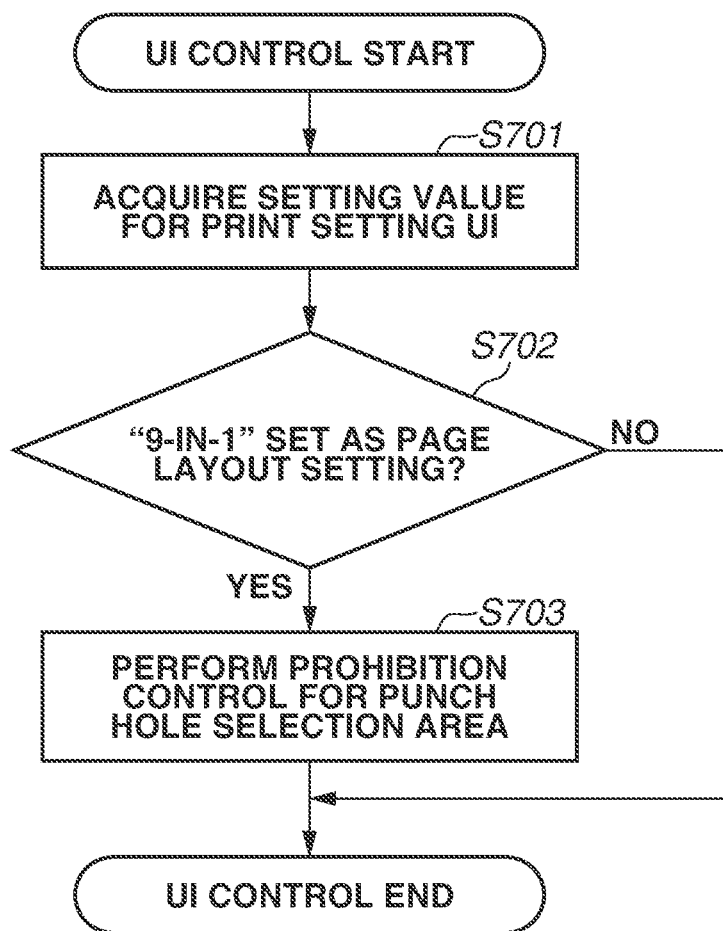
FIG. 7 is a flowchart illustrating a flow of UI prohibition control determination processing for the printing system according to the first exemplary embodiment.

FIG. 7 is a flowchart illustrating a flow of UI prohibition control determination processing for the printing system according to the first exemplary embodiment.

In step S701, the information processing apparatus 102 acquires a setting value for the print setting UI 500. In step S702, the information processing apparatus 102 determines whether the value set in the page layout selection area 523 (in other words, the page layout selection item 523) indicates "9-in-1". In a case where it is determined that the value set in the page layout selection area 523 indicates "9-in-1" (YES in step S702), the processing proceeds to step S703. In step S703, the information processing apparatus 102 performs a prohibition control operation on the punch hole selection area 525. Specifically, in a case where the value set in the punch hole selection area 525 (in other words, the punch hole selection item 525) indicates "two holes (double)" or "three holes (double)", the setting value is changed to another value and options for "two holes (double)" and "three holes (double)" are grayed out so that the options cannot be selected. In another prohibition control operation, for example, in a case where "9-in-1" is selected in the page layout selection area 523, a warning message indicating that the options for "two holes (double)" and "three holes (double)" cannot be selected in the punch hole selection area 525 is displayed. In any of these prohibition control operations, in a case where "9-in-1" is designated in the page layout selection area 523, the state where the options for "two holes (double)" and "three holes (double)" cannot be selected in the punch hole selection area 525 is maintained. Another method can be employed in which the user is permitted to select a setting for "two holes (double)" or "three holes (double)" and a setting for "9-in-1", while a print job including both of the settings is prohibited from being issued. Specifically, a method for masking an OK (print setting complete) button for issuing a print job can also be employed. More alternatively, any one of the settings can be automatically changed (e.g., "double" is changed to "single", or "9-in-1" is changed to "1-in-1") before a print job is issued. These methods are also included in the present exemplary embodiment.

In this flowchart, the determination as to whether "9-in-1" is selected is made first. Instead of making the determination as to "9-in-1" first, the determination as to whether "two holes (double)" or "three holes (double)" is selected can be made first. In this case, for example, it is preferable to exclude "9-in-1" from the options for N-in-one printing number.

On the other hand, in a case where it is determined that the value set in the page layout selection area 523 does not indicate "9-in-1" (NO in step S702), the information processing apparatus 102 does not perform any special prohibition control operation on the options for the punch hole selection area 525.

The series of UI prohibition control determination processing can be executed at a timing when one of the setting values for the print setting UI 500 is changed. Alternatively, the timing of executing the series of UI prohibition control determination processing can be limited to a timing when the setting values associated with the prohibition control operation, i.e., the setting value in the page layout selection area 523 or in the punch hole selection area 525 is changed. More alternatively, the series of UI prohibition control determination processing can be executed at a timing when the OK button 531 is pressed.

The series of UI prohibition control determination processing make it possible to prohibit the punching process premised on a cutting process in a case where a page layout for "9-in-1" is set. Consequently, it is possible to prevent a product from being output as a merged document on which the imposition process in which an image section is to be cut during the cutting process thereof is performed.

The term "N-in-one printing number" refers to the number of pages to be printed on one surface (a front surface or a back surface) of one sheet.

While the first exemplary embodiment described above illustrates an example where "9-in-1" is selected, a control operation similar to that described above can also be performed in a case where a value (e.g., "25-in-1") other than "9-in-1" is set. A value based on which a control operation for "9-in-1" or a control operation equivalent to the control operation for "9-in-1" is performed is referred to as a predetermined value in the present exemplary embodiment.

A second exemplary embodiment illustrates a series of processing based on a special page layout in a case where "9-in-1" is set in the page layout selection area 523 and "two holes (double)" or "three holes (double)" is selected in the punch hole selection area 525.

Figures 8A, 8B, 8C:
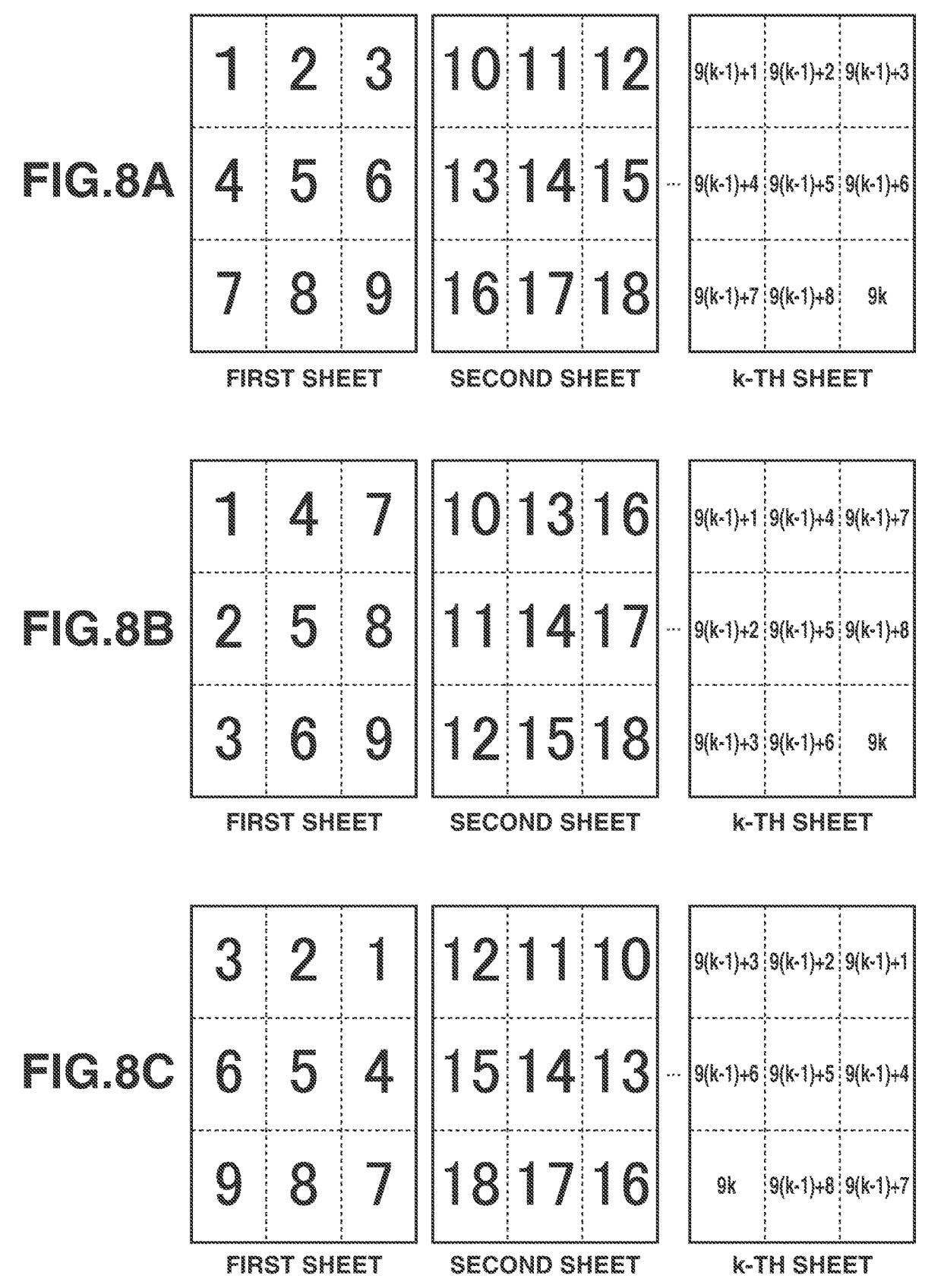

FIG. 8A is a schematic diagram illustrating a normal output material when "9-in-1" is set in the page layout selection area 523. FIG. 8A illustrates a correlation between an output sheet in single-sided printing and the page number in original data. Examples of the order of pages that can be arranged on a sheet are illustrated in FIGS. 8B and 8C.

Figure 9:
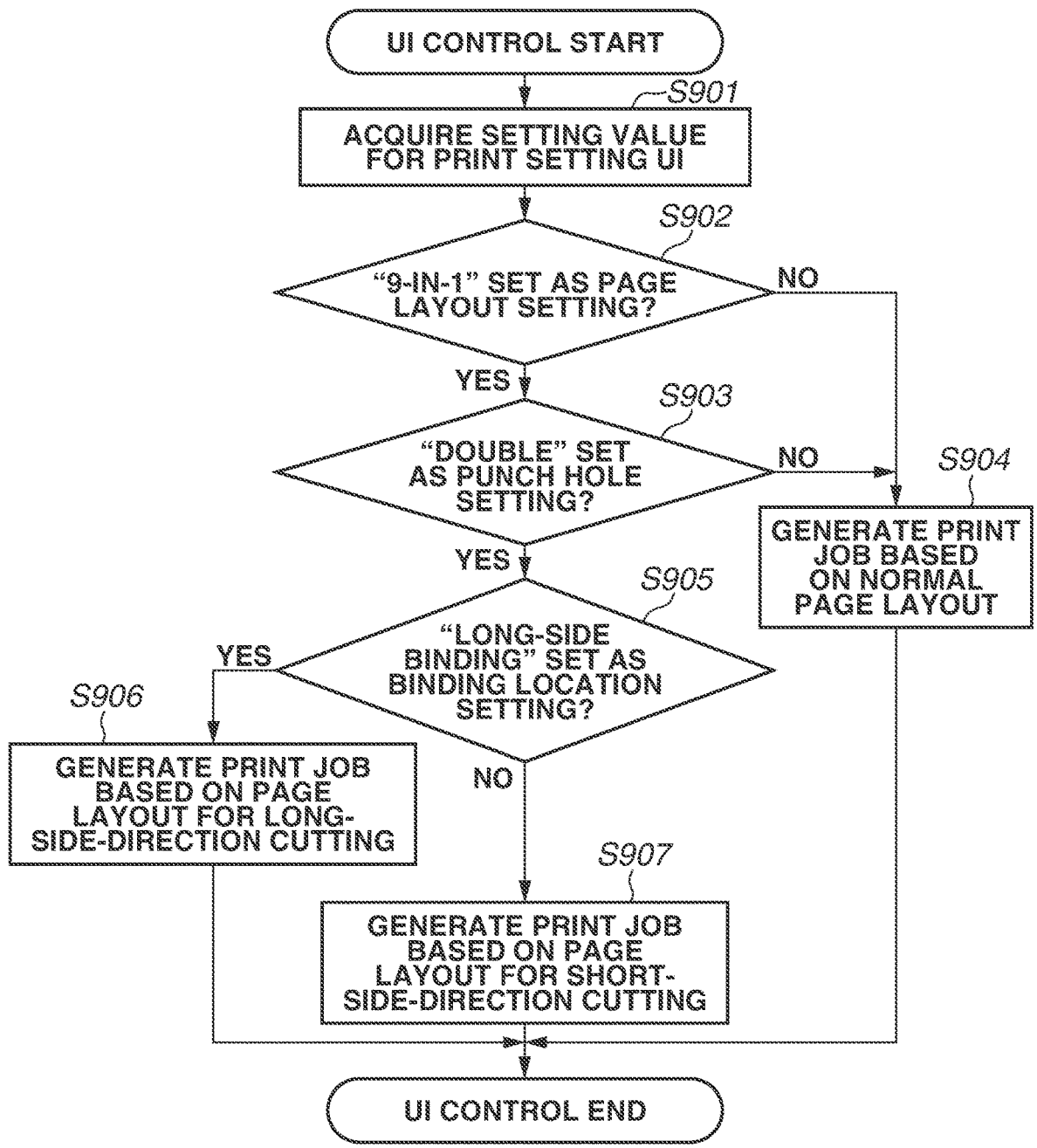
FIG. 9 is a flowchart illustrating a flow of control determination processing based on a special page layout for a printing system according to a second exemplary embodiment.

FIG. 9 is a flowchart illustrating a flow of control determination processing based on a special page layout for the printing system according to the second exemplary embodiment.

In step S901, the information processing apparatus 102 acquires a setting value for the print setting UI 500. In step S902, the information processing apparatus 102 determines whether the value set in the page layout selection area 523 indicates "9-in-1". In a case where it is determined that the value set in the page layout selection area 523 indicates "9-in-1" (YES in step S902), the processing proceeds to step S903. In step S903, the information processing apparatus 102 determines whether the value set in the punch hole selection area 525 indicates "two holes (double)" or "three holes (double)". In a case where it is determined that the value set in the page layout selection area 523 does not indicate "9-in-1" (NO in step S902), or in a case where it is determined that the value set in the punch hole selection area 525 does not indicate "two holes (double)" or "three holes (double)" (NO in step S903), the processing proceeds to step S904. In step S904, the information processing apparatus 102 generates a print job based on a normal page layout. On the other hand, in a case where it is determined that the value set in the punch hole selection area 525 indicates "two holes (double)" or "three holes (double)" (YES in step S903), the processing proceeds to step S905. In step S905, the information processing apparatus 102 determines whether the value set in the binding location selection area 524 indicates "long-side binding". In a case where it is determined that the value set in the binding location selection area 524 indicates "long-side binding" (YES in step S905), the processing proceeds to step S906. In step S906, the information processing apparatus 102 generates a print job based on a page layout premised on long-side-direction cutting. On the other hand, in a case where it is determined that the value set in the binding location selection area 524 does not indicate "long-side binding" (NO in step S905), the processing proceeds to step S907. In step S907, the information processing apparatus 102 generates a print job based on a page layout premised on short-side-direction cutting.

FIG. 10A is a schematic diagram illustrating an example of the output material based on the page layout premised on the long-side-direction cutting in step S906. FIG. 10A illustrates a correspondence between an output sheet in single-sided printing and the page number in original data. FIG. 10B is a schematic diagram illustrating an example of the output material based on the page layout premised on the short-side-direction cutting in step S907. FIG. 10B illustrates a correspondence between an output sheet in single-sided printing and the page number in original data. As illustrated in FIGS. 10A and 10B, in steps S906 and S907, processing based on a special page layout, in which no images are rendered in a section corresponding to a cutting section, is performed based on the page layout for "9-in-1".

Figure 11:
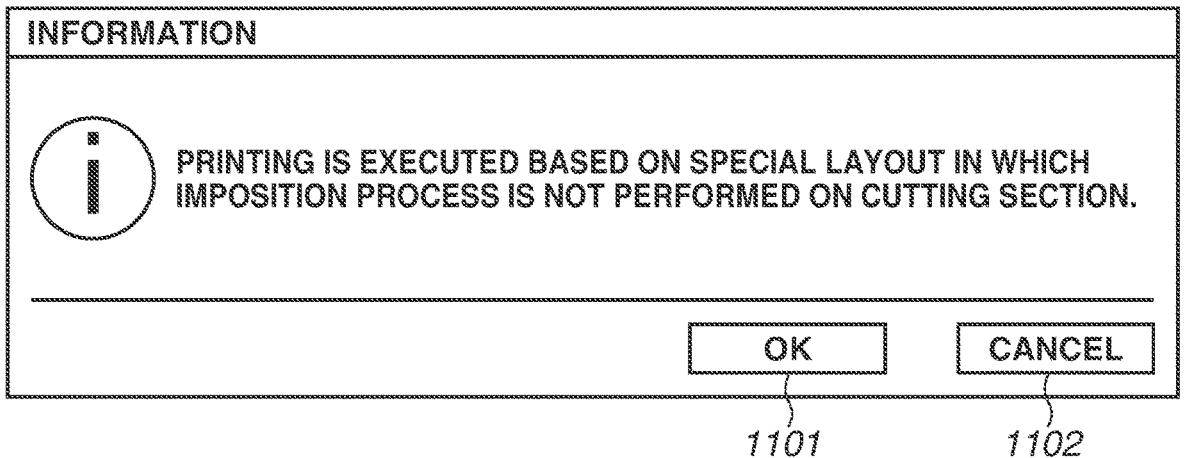
FIG. 11 illustrates an example of a display message according to the second exemplary embodiment.

The series of processing based on the special page layout are executed at a timing when the OK button 531 is pressed. In this special page layout, the N-in-one printing number set for one output sheet is not "9". Accordingly, a message illustrated in FIG. 11 can be displayed between the processes of steps S903 to S905 to prompt the user to check the page layout. When an OK button 1101 is pressed, the processing can proceed to step S905, and when a cancel button 1102 is pressed, the processing can return to a print setting screen using the print setting UI 500, instead of proceeding to step S905.

The series of processing based on the special page layout make it possible to prevent a product from being output as a merged document on which the imposition process in which an image section is to be cut during the cutting process thereof is performed.

A third exemplary embodiment illustrates a flow of UI prohibition control determination processing for the printing system in a case where "2-in-1" is set in the page layout selection area 523.

Figure 12:
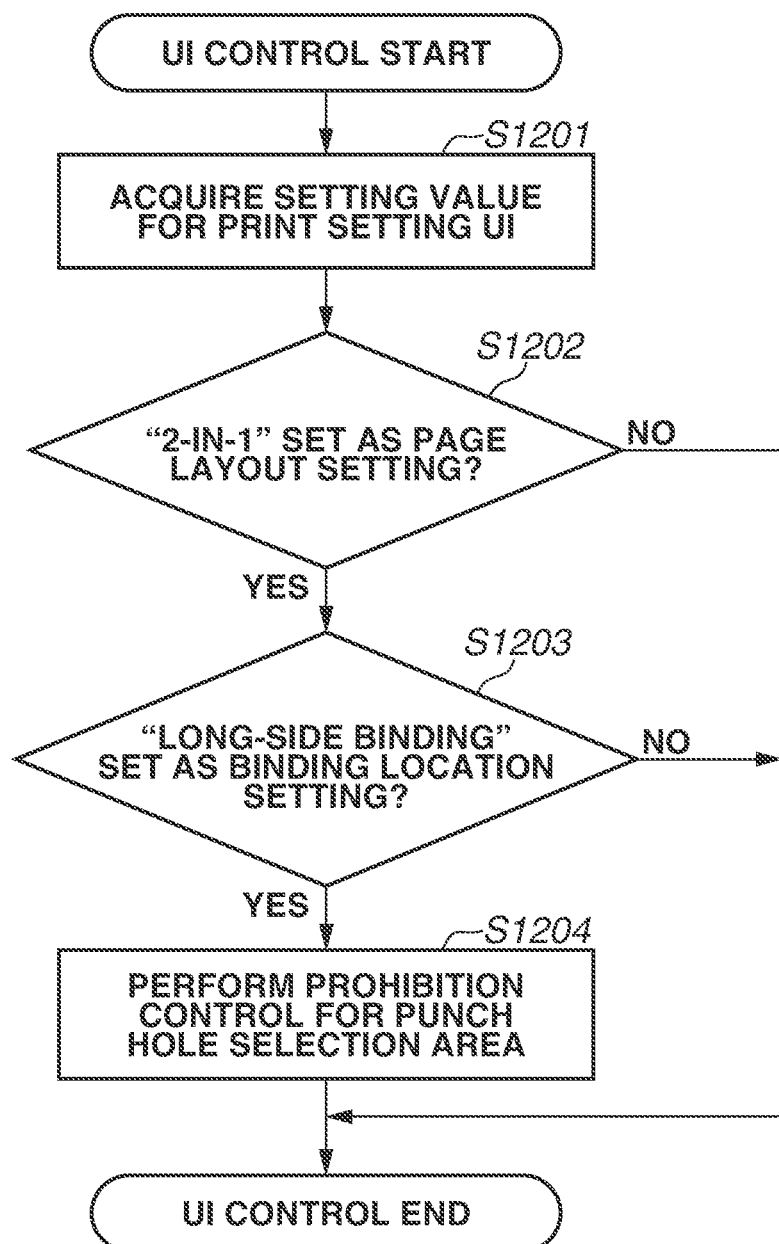
FIG. 12 is a flowchart illustrating a flow of UI prohibition control determination processing for a printing system according to a third exemplary embodiment.

FIG. 12 is a flowchart illustrating a flow of UI prohibition control determination processing for the printing system according to the third exemplary embodiment.

In step S1201, the information processing apparatus 102 acquires a setting value for the print setting UI 500. In step S1202, the information processing apparatus 102 determines whether the value set in the page layout selection area 523 indicates "2-in-1". In a case where it is determined that the value set in the page layout selection area 523 indicates "2-in-1" (YES in step S1202), the processing proceeds to step S1203. In step S1203, the information processing apparatus 102 determines whether the value set in the binding location selection area 524 indicates "long-side binding". In a case where it is determined that the value set in the binding location selection area 524 indicates "long-side binding" (YES in step S1203), the processing proceeds to step S1204. In step S1204, the information processing apparatus 102 performs a prohibition control operation on the punch hole selection area 525. The prohibition control operation in step S1204 is similar to the prohibition control operation described in the first exemplary embodiment. In any of these prohibition control operations, in a case where "2-in-1" is designated in the page layout selection area 523 and "long-side binding" is selected in the binding location selection area 524, the state where the options for "two holes (double)" and "three holes (double)" cannot be selected in the punch hole selection area 525 is maintained.

On the other hand, in a case where it is determined that the value set in the page layout selection area 523 does not indicate "2-in-1" (NO in step S1202), the information processing apparatus 102 does not perform any special prohibition control operation on the options for the punch hole selection area 525. Also, in a case where it is determined that the value set in the binding location selection area 524 does not indicate "long-side binding" in step S1203, the information processing apparatus 102 does not perform any special prohibition control operation on the options for the punch hole selection area 525.

The series of UI prohibition control determination processing can be executed at a timing when the any one of the setting values for the print setting UI 500 is changed, like in the first exemplary embodiment. Alternatively, the timing of executing the series of UI prohibition control determination processing can be limited to a timing when the setting values associated with the prohibition control operation, i.e., the setting value in the page layout selection area 523 or in the punch hole selection area 525 is changed. More alternatively, the series of UI prohibition control determination processing can be executed at a timing when the OK button 531 is pressed.

The series of UI prohibition control determination processing make it possible to prohibit the punching process premised on the cutting process in a case where a page layout for "2-in-1" is set. Consequently, it is possible to prevent a product from being output as a merged document on which the imposition process in which an image section is to be cut during cutting thereof is performed.

Figure 13A:
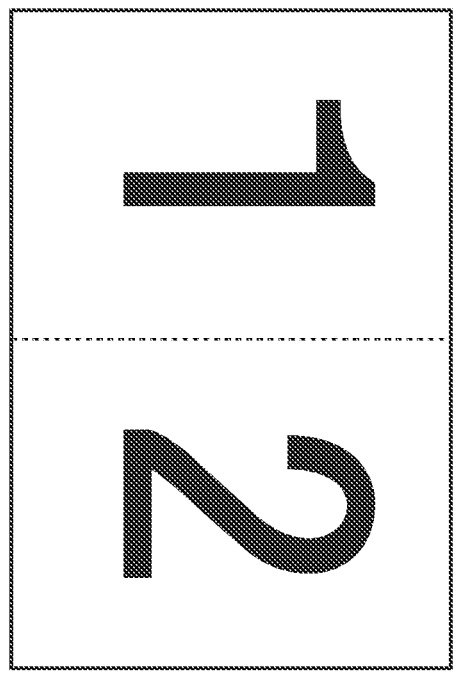
FIGS. 13A and 13B are schematic diagrams each illustrating an output material when "2-in-1" is set.
Figure 13B:
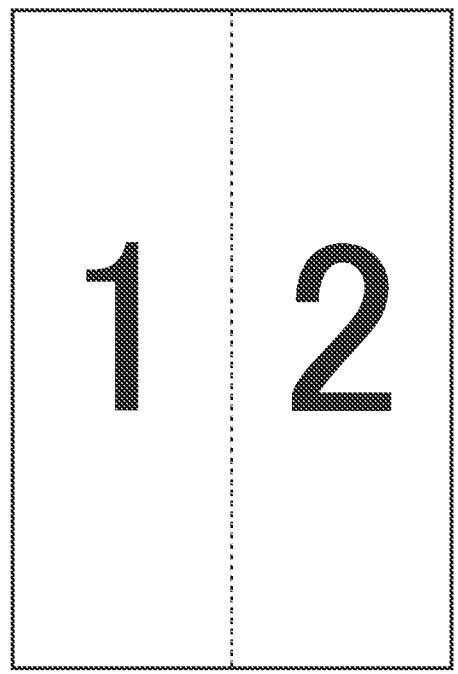

The third exemplary embodiment described above is based on the premise that images of two pages are rendered in a long-side direction as illustrated in FIG. 13A as an N-in-one printing orientation of the sheet in a case where "2-in-1" is set in the page layout selection area 523. However, as for the N-in-one printing orientation of the sheet when "2-in-1" is set in the page layout selection area 523, two pages may be arranged in the short-side direction as illustrated in FIG. 13B. In consideration of this, a fourth exemplary embodiment illustrates a flow of UI prohibition control determination processing for the printing system when "2-in-1" is set in the page layout selection area 523.

Figure 14:
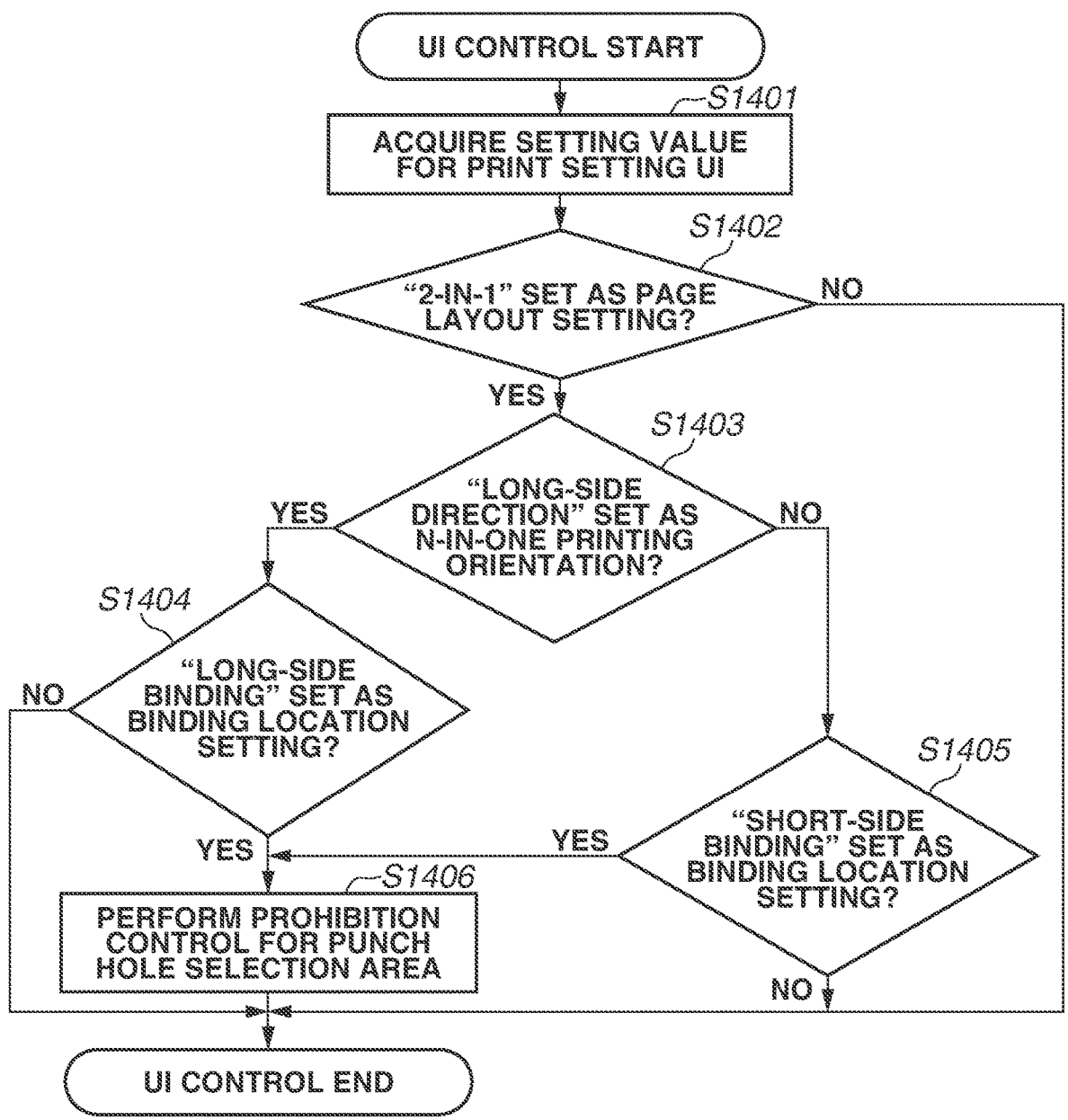
FIG. 14 is a flowchart illustrating a flow of UI prohibition control determination processing for a printing system according to a fourth exemplary embodiment.

FIG. 14 is a flowchart illustrating a flowchart of UI prohibition control determination processing for the printing system according to the fourth exemplary embodiment.

In step S1401, the information processing apparatus 102 acquires a setting value for the print setting UI 500. In step S1402, the information processing apparatus 102 determines whether the value set in the page layout selection area 523 indicates "2-in-1". In a case where it is determined that the value set in the page layout selection area 523 indicates "2-in-1" (YES in step S1402), the processing proceeds to step S1403. In step S1403, the information processing apparatus 102 determines whether images of two pages are rendered in the long-side direction set as the N-in-one printing orientation of the sheet. In a case where it is determined that images of two pages are rendered in the long-side direction set as the N-in-one printing orientation of the sheet (YES in step S1403), the processing proceeds to step S1404. In step S1404, the information processing apparatus 102 determines whether the value set in the binding location selection area 524 indicates "long-side binding". On the other hand, in a case where it is determined that images of two pages are not rendered in the long-side direction set as the N-in-one printing orientation of the sheet (NO in step S1403), the processing proceeds to step S1405. In step S1405, the information processing apparatus 102 determines whether the value set in the binding location selection area 524 indicates "short-side binding". In a case where it is determined that the value set in the binding location selection area 524 indicates "long-side binding" (YES in step S1404), or in a case where it is determined that the value set in the binding location selection area 524 indicates "short-side binding" (YES in step S1405), the processing proceeds to step S1406. In step S1406, the information processing apparatus 102 performs a prohibition control operation on the punch hole selection area 525. The prohibition control operation in step S1406 is similar to the prohibition control operation described in the third exemplary embodiment. In any of these prohibition control operations, the state where the options for "two holes (double)" and "three holes (double)" cannot be selected in the punch hole selection area 525 is maintained.

Examples of the method for determining the N-in-one printing orientation of the sheet in step S1403 will be described below. In one example, the N-in-one printing orientation is determined based on a correspondence table prepared in advance. In a case where a standard sheet size is set as a sheet size, an aspect ratio of the sheet is known. Accordingly, the N-in-one printing orientation is preliminarily determined for each sheet size as indicated in the correspondence table of FIG. 15 and the determination is made based on the N-in-one printing orientation.

Figure 16A:
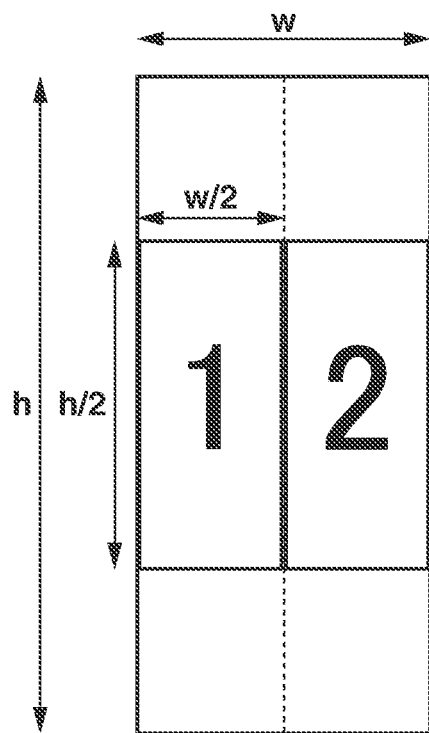
FIGS. 16A and 16B are diagrams for comparison between reduction ratios when "2-in-1" is set.
Figure 16B:
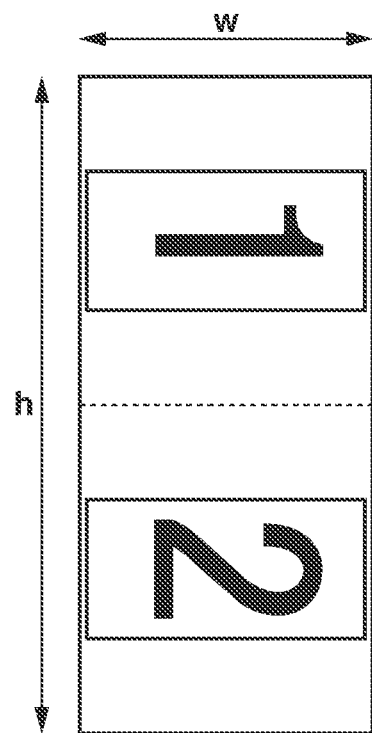

In another example, an aspect ratio of a sheet size is calculated and the N-in-one printing orientation is determined based on the calculated aspect ratio. In a case where two pages are printed on one sheet, in a case where a vertical length of the sheet is twice or more as long as a horizontal length of the sheet, an image of each of two pages to be rendered in the short-side direction can be set to be larger than an image of each of two pages to be rendered in the long-side direction. FIGS. 16A and 16B are diagrams for comparison between these cases. FIG. 16A illustrates a case where images of two pages are rendered in the short-side direction in a case where a vertical length h of a sheet is twice or more as long as a horizontal length w of the sheet. A reduction ratio in this case is represented by (w/2)/w=0.5. On the other hand, FIG. 16B illustrates a case where images of two pages are rendered in the long-side direction in a case where the vertical length h of the sheet is twice or more as long as the horizontal length w of the sheet. A reduction ratio in this case is represented by w/h, and therefore, h>2 w holds. Accordingly, the reduction ratio in this case is smaller than 0.5, and thus an image of each page to be rendered in FIG. 16B is smaller than an image of each page to be rendered in FIG. 16A. In N-in-one printing, it is desirable to render images of pages to be printed on one sheet with an image as large as possible. Therefore, the aspect ratio of each sheet size is calculated, and in a case where the vertical length h of the sheet is twice or more as long as the horizontal length w of the sheet, it is determined that images of two pages are rendered in the long-side direction, and in the other cases, it is determined that images of two pages are rendered in the short-side direction.

On the other hand, in a case where it is determined that the value set in the binding location selection area 524 does not indicate "long-side binding" (NO in step S1404), the information processing apparatus 102 does not perform any special prohibition control operation on the operations for the punch hole selection area 525. Also, in a case where it is determined that the value set in the binding location selection area 524 does not indicate "short-side binding" in step S1405 (NO in step S1405), the information processing apparatus 102 does not perform any special prohibition control operation on the options for the punch hole selection area 525.

The series of UI prohibition control determination processing can be executed at a timing when any one of the setting values for the print setting UI 500 is changed, like in the third exemplary embodiment. Alternatively, the timing of executing the series of UI prohibition control determination processing can be limited to a timing when the setting values associated with the prohibition control operation, i.e., the setting value in the page layout selection area 523 or in the punch hole selection area 525 is changed. More alternatively, the series of UI prohibition control determination processing can be executed at a timing when the OK button 531 is pressed.

The series of UI prohibition control determination processing make it possible to prohibit the punching process premised on the cutting process in a case where a page layout for "2-in-1" is set. Consequently, it is possible to prevent a product from being output as a merged document on which the imposition process in which an image section is to be cut during cutting thereof is performed.

Figure 17:
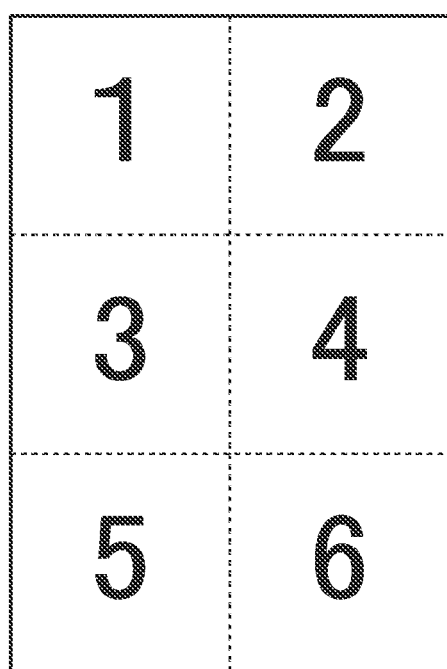
FIG. 17 is a schematic diagram illustrating an output material when "6-in-1" is set.
Figure 18:
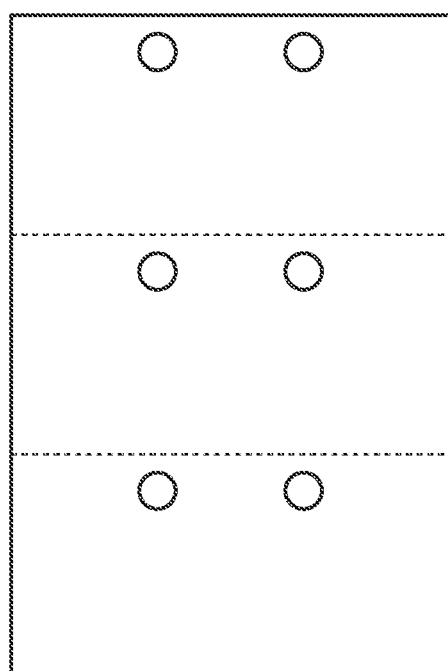
FIG. 18 is a schematic diagram illustrating an output material obtained by performing a two-hole punching process at three locations on a sheet.

While the third exemplary embodiment as above describes an example where the N-in-one printing number is "2", the N-in-one printing number is not limited to "2". For example, in a case where the N-in-one printing number is "6", an output material with a page layout illustrated in FIG. 17 is obtained. In this case, in a case where it is determined that the value set in the binding location selection area 524 indicates "short-side binding", the prohibition control operation is performed in the manner as described above, thereby obtaining the same advantageous effects as those of the third exemplary embodiment even when the N-in-one printing number is "6".

While the exemplary embodiments as above describe the punching process assuming that an output sheet is to be cut at the center thereof, a cutting section is not limited to the center of a sheet. For example, when "two holes (triple)" for performing a two-hole punching process at three locations is selected in the punch hole selection area 525, it is determined that this output material is not cut at the center thereof, but is cut into three parts. In this case, the prohibition control operation is performed to prohibit the imposition process in which an image section is to be cut during the cutting process thereof from being performed on the premise that the sheet is cut into three parts, thereby obtaining the same advantageous effects as those described above.

Other Embodiments

According to an aspect of the present disclosure, it is possible to prevent a product from being output as a merged document on which an imposition process in which an image section is to be cut during cutting thereof is performed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-212296, filed Nov. 25, 2019, which is hereby incorporated by reference herein in its entirety.

What is claimed is:

1. An apparatus comprising:
   a punch setting unit configured to make a first punch setting for punching one row of holes in one sheet, and configured to make a second punch setting for punching a number of rows of holes in one sheet;
   a setting unit configured to set a predetermined number of pages to be arranged on one surface of one sheet; and
   a control unit configured to not allow the second punch setting and the setting of the predetermined number of pages to be arranged on one surface of one sheet to be both made, and configured to allow the first punch setting and the setting of the predetermined number of pages to be arranged on one surface of one sheet to be both made,
   wherein the predetermined number of pages is nine.

2. The apparatus according to claim 1, wherein the predetermined number of pages is nine.

3. The apparatus according to claim 1, wherein the number of rows of holes is two.

4. The apparatus according to claim 1, wherein the control unit is configured to:
   allow the second punch setting and setting of one page to be arranged on one surface of one sheet to be both made, and
   allow the first punch setting and setting of one page to be arranged on one surface of one sheet to be both made.

5. The apparatus according to claim 1, wherein the control unit is configured to change the second punch setting to another setting based on a determination that the predetermined number of pages to be arranged on one surface of one sheet is made.

6. The apparatus according to claim 5, wherein the other setting is the first punch setting.

7. The apparatus according to claim 1, wherein the control unit is configured to change the setting of the predetermined number of pages to be arranged on one surface of one sheet to setting of another number of pages to be arranged on one surface of one sheet based on a determination that the second punch setting is made.

8. An apparatus comprising:
   a punch setting unit configured to make a first punch setting for punching one row of holes in one sheet, and configured to make a second punch setting for punching a number of rows of holes in one sheet;
   a setting unit configured to set a predetermined number of pages to be arranged on one surface of one sheet; and
   a control unit configured to not allow the second punch setting and the setting of the predetermined number of pages to be arranged on one surface of one sheet to be both made, and configured to allow the first punch setting and the setting of the predetermined number of pages to be arranged on one surface of one sheet to be both made,
   wherein the control unit further is configured to gray out an item for making the second punch setting based on a determination that the predetermined number of pages to be arranged on one surface of one sheet is made, and
   wherein the predetermined number of pages is nine.

9. The apparatus according to claim 1, wherein the control unit is configured not to issue a print job including both the second punch setting and the setting of the predetermined number of pages to be arranged on one surface of one sheet.

10. A method for an apparatus, the method comprising:
    making a first punch setting for punching one row of holes in one sheet, and making a second punch setting for punching a number of rows of holes in one sheet;
    setting a predetermined number of pages to be arranged on one surface of one sheet; and
    not allowing the second punch setting and the setting of the predetermined number of pages to be arranged on one surface of one sheet to be both made, and allowing the first punch setting and the setting of the predetermined number of pages to be arranged on one surface of one sheet to be both made,
    wherein the predetermined number of pages is nine.

11. An apparatus comprising:
    a punch setting unit configured to make a first punch setting for punching one row of holes in one sheet, and configured to make a second punch setting for punching a number of rows of holes in one sheet;
    a setting unit configured to set a predetermined number of pages to be arranged on one surface of one sheet; and
    a control unit configured to prevent the second punch setting and the setting of the predetermined number of pages to be arranged on one surface of one sheet from being both made, and configured to not prevent the first punch setting and the setting of the predetermined number of pages to be arranged on one surface of one sheet from being both made,
    wherein the predetermined number of pages is nine.

12. The apparatus according to claim 11, wherein the predetermined number of pages is nine.

13. The apparatus according to claim 11, wherein the number of rows of holes is two.

14. The apparatus according to claim 11, wherein the control unit is configured to:
    allow the second punch setting and setting of one page to be arranged on one surface of one sheet to be both made, and
    allow the first punch setting and setting of one page to be arranged on one surface of one sheet to be both made.

15. The apparatus according to claim 11, wherein the control unit is configured to change the second punch setting to another setting based on a determination that the predetermined number of pages to be arranged on one surface of one sheet is made.

16. The apparatus according to claim 15, wherein the other setting is the first punch setting.

17. The apparatus according to claim 11, wherein the control unit is configured to change the setting of the predetermined number of pages to be arranged on one surface of one sheet to setting of another number of pages to be arranged on one surface of one sheet based on a determination that the second punch setting is made.

18. The apparatus according to claim 11, wherein the control unit is configured to gray out an item for making the second punch setting based on a determination that the predetermined number of pages to be arranged on one surface of one sheet is made.

19. The apparatus according to claim 11, wherein the control unit is configured not to issue a print job including both the second punch setting and the setting of the predetermined number of pages to be arranged on one surface of one sheet.

20. A method for an apparatus, the method comprising:
making a first punch setting for punching one row of holes in one sheet, and making a second punch setting for punching a number of rows of holes in one sheet;
setting a predetermined number of pages to be arranged on one surface of one sheet; and
preventing the second punch setting and the setting of the predetermined number of pages to be arranged on one surface of one sheet from being both made, and not preventing the first punch setting and the setting of the predetermined number of pages to be arranged on one surface of one sheet from being both made,
wherein the predetermined number of pages is nine.

21. An apparatus comprising:
a punch setting unit configured to make a first punch setting for punching one row of holes in one sheet, and configured to make a second punch setting for punching a number of rows of holes in one sheet;
a setting unit configured to set a predetermined number of pages to be arranged on one surface of one sheet; and
a control unit configured to perform control such that a print job including the first punch setting and the setting of the predetermined number of pages to be arranged on one surface of one sheet is issuable, and configured to perform control such that a print job including the second punch setting and the setting of the predetermined number of pages to be arranged on one surface of one sheet is not issuable,
wherein the predetermined number of pages is nine.

22. The apparatus according to claim 21, wherein the predetermined number of pages is nine.

23. The apparatus according to claim 21, wherein the number of rows of holes is two.

24. The apparatus according to claim 21, wherein the control unit is configured to:
allow the second punch setting and setting of one page to be arranged on one surface of one sheet to be both made, and
allow the first punch setting and setting of one page to be arranged on one surface of one sheet to be both made.

25. The apparatus according to claim 21, wherein the control unit is configured to change the second punch setting to another setting based on a determination that the predetermined number of pages to be arranged on one surface of one sheet is made.

26. The apparatus according to claim 25, wherein the other setting is the first punch setting.

27. The apparatus according to claim 21, wherein the control unit is configured to change the setting of the predetermined number of pages to be arranged on one surface of one sheet to setting of another number of pages to be arranged on one surface of one sheet based on a determination that the second punch setting is made.

28. The apparatus according to claim 21, wherein the control unit is configured to gray out an item for making the second punch setting based on a determination that the predetermined number of pages to be arranged on one surface of one sheet is made.

29. The apparatus according to claim 21, wherein the control unit is configured not to issue a print job including both the second punch setting and the setting of the predetermined number of pages to be arranged on one surface of one sheet.

30. A method for an apparatus, the method comprising:
making a first punch setting for punching one row of holes in one sheet, and making a second punch setting for punching a number of rows of holes in one sheet;
setting a predetermined number of pages to be arranged on one surface of one sheet; and
performing control such that a print job including the first punch setting and the setting of the predetermined number of pages to be arranged on one surface of one sheet is issuable, and performing control such that a print job including the second punch setting and the setting of the predetermined number of pages to be arranged on one surface of one sheet is not issuable,
wherein the predetermined number of pages is nine.

* * * * *